US008640131B2

(12) United States Patent
Bernardi et al.

(10) Patent No.: US 8,640,131 B2
(45) Date of Patent: Jan. 28, 2014

(54) DEMAND-BASED PROCESSOR CYCLE ALLOCATION SUBSEQUENT TO EQUAL GROUP-BASED PROCESSOR CYCLE DISTRIBUTION

(75) Inventors: Ara Bernardi, Mercer Island, WA (US); Costin Hagiu, Sammamish, WA (US); Nelamangal Krishnaswamy Srinivas, Sammamish, WA (US); Ashwin Palekar, Sammamish, WA (US); Arun U. Kishan, Bellevue, WA (US); Karthik Thirumalai, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1462 days.

(21) Appl. No.: 12/016,869

(22) Filed: Jan. 18, 2008

(65) Prior Publication Data

US 2009/0187784 A1 Jul. 23, 2009

(51) Int. Cl.
*G06F 9/46* (2006.01)
(52) U.S. Cl.
USPC .......................................................... 718/102
(58) Field of Classification Search
USPC .......................................................... 718/102
See application file for complete search history.

(56) References Cited

U.S. PATENT DOCUMENTS

| 5,745,778 | A | 4/1998 | Alfieri |
| 5,774,718 | A | 6/1998 | Aoshima et al. |
| 5,944,778 | A | 8/1999 | Takeuchi et al. |
| 6,003,061 | A | 12/1999 | Jones et al. |
| 6,105,053 | A * | 8/2000 | Kimmel et al. ............... 718/105 |
| 6,148,324 | A | 11/2000 | Ransom et al. |
| 6,341,303 | B1 | 1/2002 | Rhee et al. |
| 6,668,269 | B1 | 12/2003 | Kamada et al. |
| 6,990,665 | B2 | 1/2006 | Ballantyne |
| 7,761,875 | B2 * | 7/2010 | Karamanolis et al. ........ 718/102 |
| 2004/0064817 | A1 * | 4/2004 | Shibayama et al. .......... 718/104 |
| 2006/0206887 | A1 | 9/2006 | Dodge et al. |
| 2007/0226739 | A1 * | 9/2007 | Dodge et al. .................. 718/102 |

OTHER PUBLICATIONS

"Fair-share scheduling," Nov. 28, 2004, Wikipedia.*
"Round-robin scheduling," Sep. 23, 2006, Wikipedia.*
Haldar et al., "Fairness in Processor Scheduling in Time Sharing Systems", found at <<http://www.cs.umb.edu/~jxs/courses/2007/697/papers/haldar.pdf>>, ACM SIGOPS OPErating Systems Review, vol. 25, Issue 1, Jan. 1991, pp. 4-18.
Lin et al., "A Soft Real-time Scheduling Server on the Windows NT", found at <<http://www.csie.ntu.edu.tw/~hchu/papers/usenix-nt-98.pdf>>, in Proc. of 2nd USENIX Windows NT Symposium, Seattle, WA, Aug. 1998, 7 pgs.

(Continued)

*Primary Examiner* — Thomas Lee
*Assistant Examiner* — Xuxing Chen
(74) *Attorney, Agent, or Firm* — Lee & Hayes, PLLC

(57) ABSTRACT

Embodiments that facilitate the fair and dynamic distribution of central processing unit (CPU) time are disclosed. In accordance with one embodiment, a method includes organizing one or more processes into one or more groups. The method further includes allocating a CPU time interval for each group. The allocation of a CPU time interval for each group is accomplished by equally distributing a CPU cycle based on the number of groups. The method also includes adjusting the allocated CPU time intervals based on a change in the quantity of the one or more groups.

19 Claims, 10 Drawing Sheets

(56) References Cited

OTHER PUBLICATIONS

"Multilevel Queue", available at least as early as Oct. 4, 2007, at <<http://www.mines.edu/Academic/courses/math_cs/macs442/resources/S9schedul-Part2.pdf>>, pp. 40-45.

Steere et al., "A Feedback-Driven Proportion Allocator for Real-Rate Scheduling", found at <<http://www.usenix.org/publications/library/proceedings/osdi99/full_papers/steere/steere.pdf>>, Proceedings 3rd Symposium on Operating Systems Design and Implementation, Feb. 1999, 15 pgs.

* cited by examiner

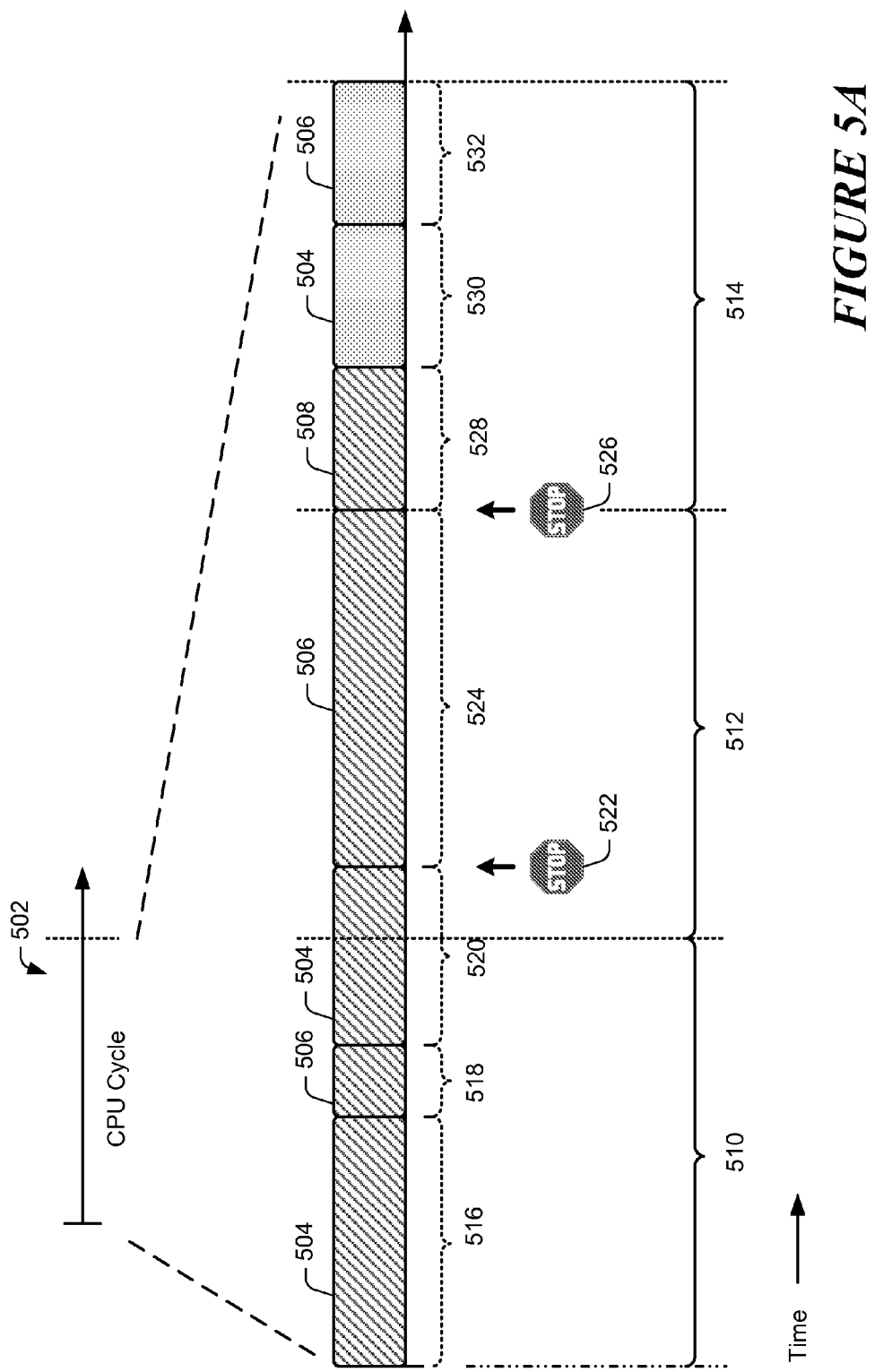

US 8,640,131 B2

DEMAND-BASED PROCESSOR CYCLE ALLOCATION SUBSEQUENT TO EQUAL GROUP-BASED PROCESSOR CYCLE DISTRIBUTION

BACKGROUND

Current Central Processing Unit (CPU) scheduling mechanisms distribute CPU time-slots across processes, wherein each process uses a collection of threads. Allocation of CPU time to a process in turn affects the CPU time each thread in the process uses. For example, some CPU scheduling mechanisms may allocate CPU time based on the needs of each process. Other CPU scheduling mechanisms may assign priority to processes, thus ensuring that each process receives CPU time in the order of its priority. Additional "reservation-based" mechanisms may reserve CPU time for each process regardless of actual usage by each process.

These CPU scheduling mechanism may fall short of providing fair CPU time distribution in a multi-user environment, as the number of processes serving each user may vary. For instance, a significant number of the total processes may serve a particular user, while only a small remainder of the total processes serves other users. As a result, the particular user may consume a disproportionate amount of CPU time in comparison to the other users during CPU cycles. Such uneven distribution of CPU time may dramatically and adversely affect the computing experience of some users in the multi-user environment.

Additionally, the "reservation-based" CPU scheduling mechanisms may not dynamically schedule CPU time per process. For example, once a CPU time reservation is made for a particular process, the reserved portion of the CPU is not available to other processes even if the particular process has no demand for the CPU.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for implementing fair and dynamic distribution of central processing unit (CPU) time to users in a multi-user environment. In at least one embodiment, a method includes organizing one or more processes into one or more groups. The method further includes allocating a CPU time interval for each group. The allocation of a CPU time interval for each group is accomplished by equally distributing CPU cycles based on the number of groups. In an additional embodiment, the method also includes adjusting the allocated CPU time intervals based on a change in the number of the groups.

In another embodiment, a computer readable medium having computer-executable instructions that, when executed, perform acts comprising organizing one or more processes into one or more groups. The acts also include allocating a CPU time interval to each group. The allocation of a CPU time interval for each group is accomplished by distributing CPU cycles based at least on the number of groups. The acts further comprise providing one or more portions of the CPU cycle to each of a plurality of groups. The CPU cycle is provided to each group until the group is either idle or consumes its corresponding time interval. The acts additionally include providing one or more additional portions of the CPU cycle to a group that has consumed its corresponding time interval. The additional portions are provided when another group that has not consumed its corresponding time interval is idle and the CPU cycle is not complete.

In a further embodiment, a system for dynamically distributing CPU cycles to multiple groups comprises one or more processors. The system also comprises memory to store a plurality of computer-executable instructions that are executable by the one or more processors. The computer-executable instructions comprise instructions for organizing one or more processes into one or more groups. The computer-executable instructions also comprise instructions for allocating a CPU time interval for each group. The allocation of a CPU time interval for each group is accomplished by equally distributing a CPU cycle based on the number of groups. The computer-readable instructions further comprise instructions for adjusting the allocated CPU time intervals based on a change in the quantity of the groups. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 5A and 5B illustrate the conditional allocation of CPU time to one or more group, wherein each conditional allocation is in addition to an equally allocated time interval of a CPU cycle, in accordance with at least one embodiment.

DETAILED DESCRIPTION

This disclosure is directed to systems and methods that facilitate fair and dynamic distribution of central processing unit (CPU) time to each of a plurality of groups. Specifically, current CPU scheduling mechanisms may not optimally distribute CPU time in a multi-user environment. For example, there is generally variation in the number of processes within each interactive session of the multi-user environment. Thus, current CPU scheduling mechanisms may fall short of providing fair usage of the CPU across all interactive sessions. The embodiments in this disclosure are directed to allocating CPU time equally to each interactive session, or some other grouping of processes, rather than to each process.

Additionally, current CPU scheduling mechanisms may not dynamically schedule CPU time. The embodiments in this disclosure are also directed towards dynamically allocating CPU time based on the number of process groups. In this way, embodiments described herein may ensure a distribution of CPU time that does not cause application hesitations or slow downs that negatively impact users in a multi-user environment. Various examples of facilitating fair and/or dynamic CPU time distributions for all users in a multi-user environment are described below with reference to FIGS. 1-9.

Exemplary Grouping Scheme

Figure 1:
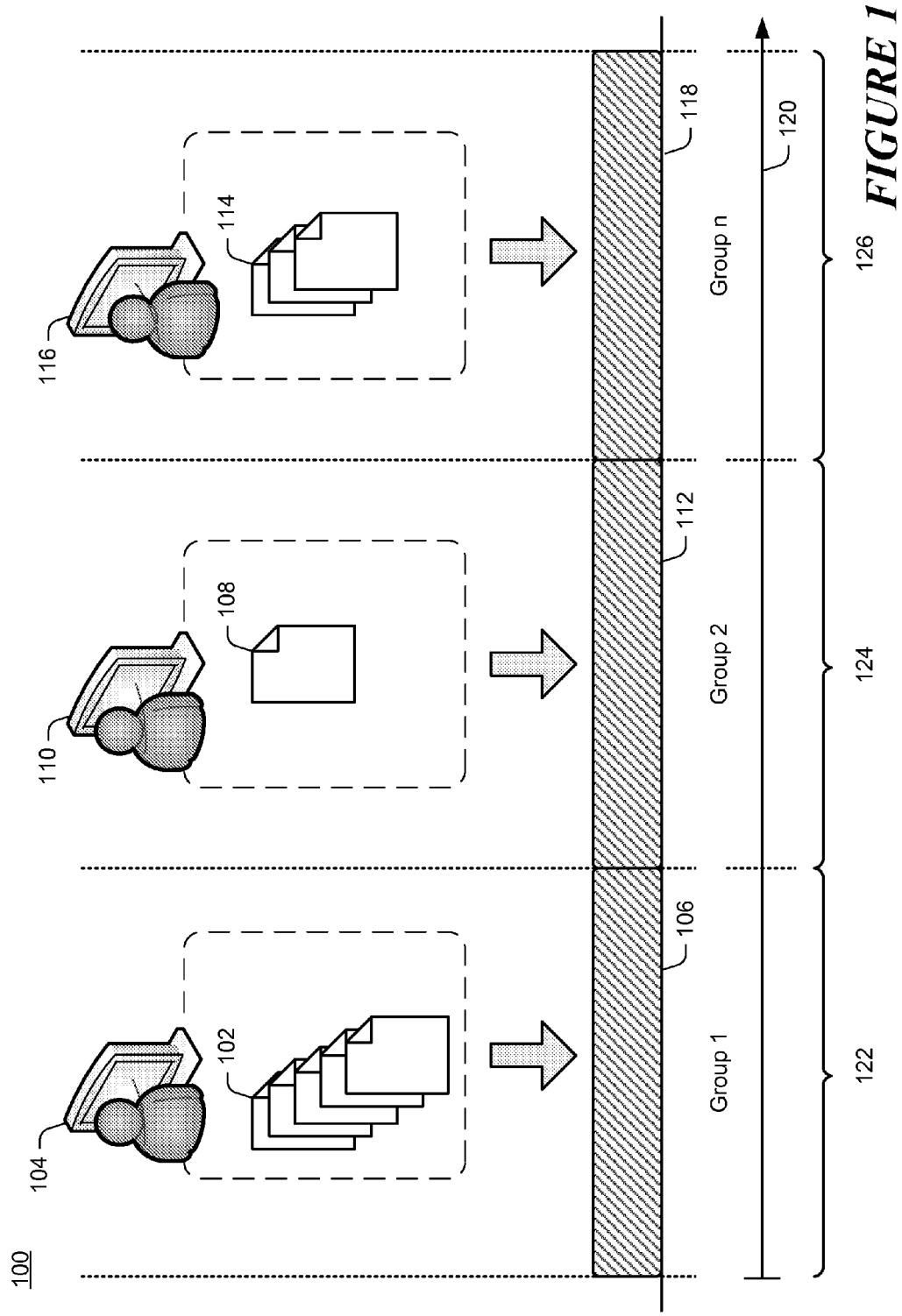
FIG. 1 is a block diagram illustrating an exemplary scheme for organizing processes into groups for fair and dynamic central processing unit (CPU) time allocation.

FIG. 1 illustrates an exemplary scheme for organizing processes into groups according to a classification criterion, in accordance with at least one embodiment of fair and dynamic central processing unit (CPU) scheduling. According to various embodiments, each group may be further provided equal central processing unit (CPU) time. This equal distribution of CPU time may ensure that no single group is able to dominate CPU time, thereby causing other processes in other groups to starve for CPU time. In some instances, the equal distribution of CPU time will enhance the operation of a multi-user environment. For example, users of terminal server computing will have generally consistent experiences with respect to the responsiveness of the computing system as a result of equal CPU time distribution to groups of processes.

Terminal server computing generally enables multiple users to access processes on the same remote computer via interactive sessions. However, each user of terminal server computing may need different computing resources. This variation in computing resource needs often creates interactive sessions that consume significantly more CPU time in a CPU cycle than other interactive sessions. For instance, a first user may access 20 processes on the remote computer via a first interactive session, while a second user may access only 10 processes via a second interactive session. In such an instance, the equal distribution of CPU time per process may result in a scenario where the first user is consuming twice as much CPU time as the second user. In turn, the second interactive session's performance may be impaired due to inadequate CPU time, and the second user's computing experience may be degraded due to the resultant delays and hesitations.

The organization of processes into groups, in accordance with one or more embodiments of fair and dynamic CPU scheduling, may alleviate impaired interactive session performance that causes degraded user experiences. In an exemplary embodiment, one or more processes that are associated with a particular interactive session may be organized into a group. In the example shown in FIG. 1, a plurality of processes 102 that are associated with an interactive session 104 may be organized into a group 106. Further, a single application 108 that is associated with an interactive session 110 may be organized into its own group 112. Likewise, a plurality of processes 114 that are associated with an interactive session 116, (which may not be as numerous as the processes 102), may be organized into group 118.

A CPU cycle, such as the CPU cycle 120, may then be divided into CPU time intervals that reflect the number of groups. In this way, each group receives an equal share, or a substantially equal share, of the CPU cycle regardless of the number of processes in the group. For example, the CPU cycle 120 may be allocated into time intervals 122, 124 and 126 to equally distribute the processing time of the CPU cycle 120 to the organized groups 106, 112, and 118. Accordingly, interactive session 110 is configured to receive the same or substantially equivalent amount of CPU time as interactive sessions 104 and 116, even though interactive session 104 includes only one process while interactive sessions 104 and 116 each include multiple processes. Thus, the equal or substantially equal distribution of CPU time to each group, wherein each group includes different number of processes, may ensure that each group is provided with adequate CPU time to prevent hesitation of the interactive session.

It will be appreciated that while the embodiment above describes the grouping of processes according to interactive sessions, processes may also be grouped according to other classification criteria. For instance, in some embodiments, the processes may be organized so that processes that act on multimedia content are in a first group, while processes that do not act on media content are in a second group. Other embodiments may include group organizations based on other classification criteria, so long as the processes are organized into groups.

Exemplary CPU Scheduler

Figure 2:
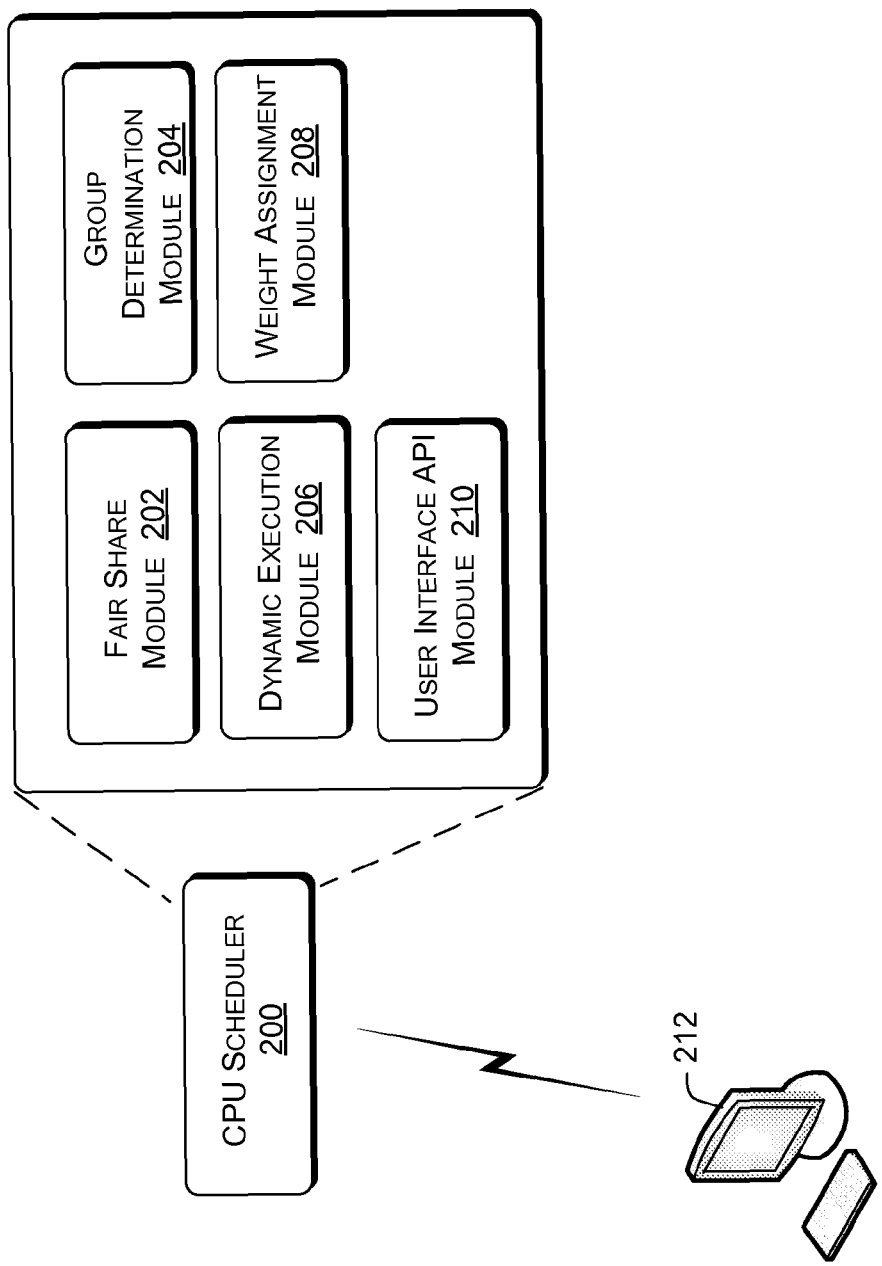
FIG. 2 is a block diagram illustrating selected components of an exemplary CPU scheduler that is configured to provide CPU time to each group, in accordance with at least one embodiment.

FIG. 2 is a block diagram illustrating selected components of an exemplary central processing unit (CPU) scheduler 200 that is configured to provide CPU time to each group in a plurality of groups, in accordance with at least one embodiment of fair and dynamic CPU scheduling. The exemplary CPU scheduler 200 may include computer program instructions that are executed by a computing device, such as the device 800 described in FIG. 8. Program instructions, or modules, may include routines, programs, objects, components, and data structures that perform particular tasks or implement particular abstract data types. The selected components of the CPU scheduler 200 include a fair share module 202, a group determination module 204, a dynamic execution module 206, a weight assignment module 208, and a user interface application program interface (API) module 210. One of ordinary skill in the art will further appreciate that exemplary CPU scheduler 200 may include other components that may be implemented for the functioning of a CPU scheduler.

The fair share module 202 may be configured to distribute a CPU cycle equally, or substantially equal, among a plurality of groups that need CPU time. Each group may include a different number of processes. For example, if t represents the time in a CPU cycle and n represents the number of groups, the fair share module 202 is configured to allocate the CPU cycle t into n time intervals such that each time interval has a duration of t/n. The fair share module 202 may also work cooperatively with the group determination module 204.

The group determination module 204 may be configured to calculate the number of groups that need CPU time in a given CPU cycle. In one example, this calculation may be performed based on the actual CPU usage in a previous cycle. According to various embodiments, the group determination module 204 may perform this calculation by taking into consideration any increase or reduction in demand due to ready-state transition of processing threads. Once the group determination module 204 has determined the number of groups that need CPU time, the group determination module 204 may return this information to the fair share module 202.

In turn, the fair share module 202 may reallocate the CPU cycle to accommodate the change in the number of groups. For example, if t represents the time in a CPU cycle, n represents the number of groups processed in a CPU cycle, and the number of groups that need CPU time in a subsequent CPU cycle has increased by one, the fair share module 202 may reallocate the CPU cycle t into n+1 groups, such that each time interval has a duration of t/(n+1). Likewise, if the group determination module 204 calculates that the number of groups that need CPU time in a subsequent CPU cycle has decreased by one, then the fair share module 202 reallocate the CPU cycle such that each time interval has a duration of t/(n−1).

The dynamic execution module 206 may be configured to command a CPU (not shown) to sequentially process each group for the time interval determined by the fair share module 202. For instance, the dynamic execution module 206 may direct the CPU to process a first group for the allocated time interval in a CPU cycle. Once the allocated time interval has ended, the dynamic execution module 206 may command the CPU to suspend the processing of the first group and perform a processing of the second group for the allocated time interval, and so on and so forth until the CPU cycle is complete. The dynamic execution module 206 may then repeat the processing for the next CPU cycle.

Furthermore, the dynamic execution module 206 may be further configured to detect whether a group has become idle. A group is idle if all the processes in the group have entered waiting states. A process in a waiting state does not consume any CPU time. For example, a process may be in a waiting state because it is waiting for input from a user. In one embodiment, when the dynamic execution module 206 detects that a first group is in idle, the dynamic execution module 206 may dynamically reallocate CPU time to one or more second groups that need CPU time, even if the first group has not consumed its entire allocated time interval. The dynamic execution module 206 may perform the reallocation of CPU time for the one or more second groups based on parameters such as the demand and/or priority of each of the one or more second groups for CPU time. The dynamic execution module 206 may be further configured with the ability to command a CPU to resume the provision of CPU time to a group that has previously received CPU time. In other words, the dynamic execution module 206 may command the CPU to process a group in discontinuous time slices as long as the total of the time slices does not exceed the allocated time interval.

Further, the dynamic execution module 206 may have the ability to direct the processing of one or more first groups beyond their allocated time intervals if some second groups are idle (e.g., lack of demand for CPU time) during the CPU cycle.

The weight assignment module 208 may be configured to assign weight to each of the one or more groups as determined by the group determination module 204. The assigned weights correlate with the amount of CPU time a group receives. For example, the weight assignment module 208 may assign a weight factor of one to a first group, a weight factor of two to a second group. Accordingly, the fair share module 202 may be configured to allocate CPU time according to the weight assigned to each group. For instance, the second group, (weight factor two), will be allocated twice as much CPU time as the first group (weight factor one) within a CPU cycle.

The user interface API module 210 may include an API that enables a user to interact with the CPU scheduler 200 via a user interface 212. For example, the user interface API module 210, in conjunction with user interface 212, may provide the user with the ability to change the one or more criteria for the organization of processes into groups, or the criteria by which weight may be assigned to each group. The user interface 212 may include, but is not limited to, combinations of one or more of keypads, keyboards, mouse devices, touch screens, microphones, speech recognition packages, and other suitable devices or other electronic/software selection methods.

Exemplary Dynamic CPU Time Allocation

Figure 3:
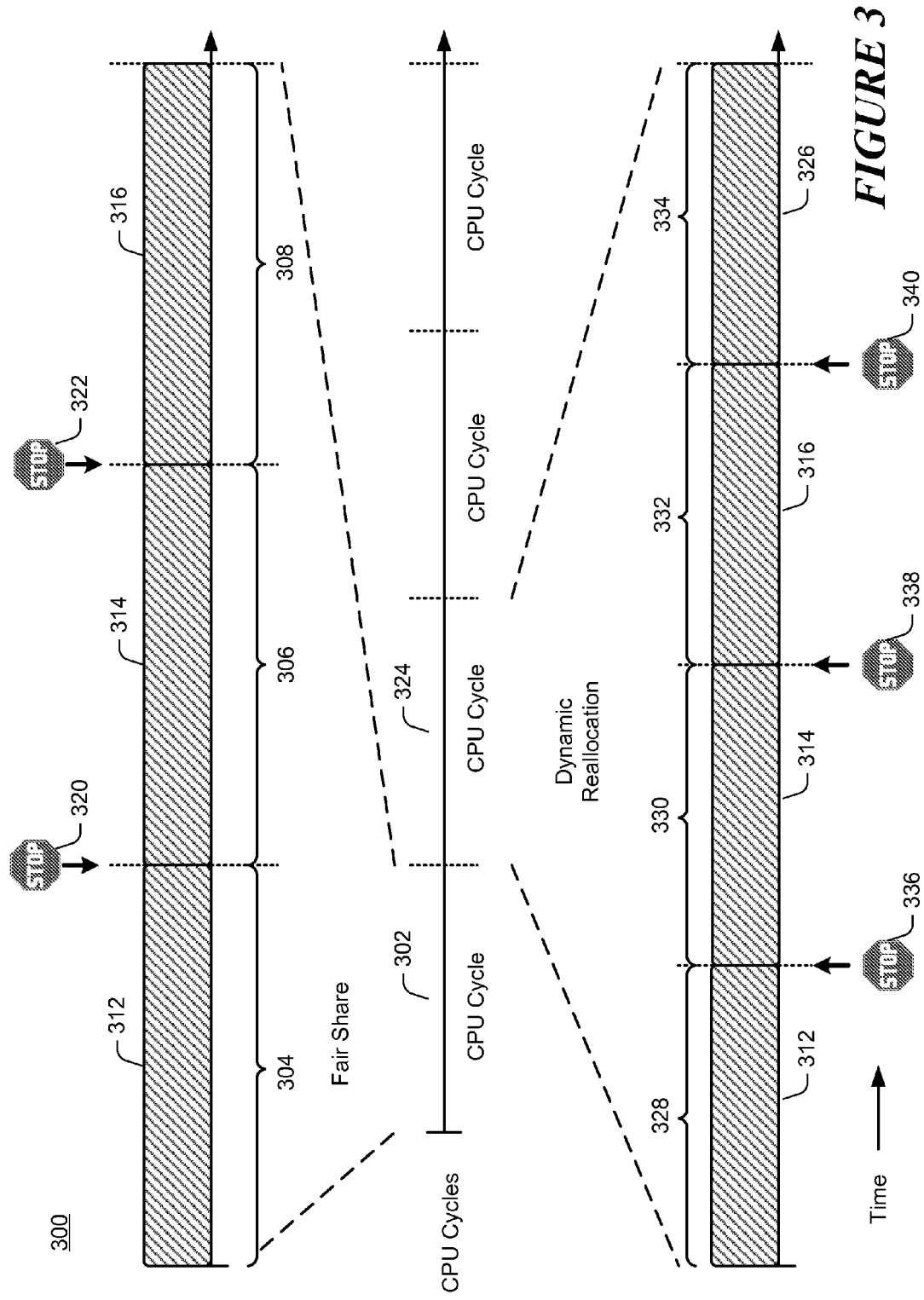
FIG. 3 is a block diagram illustrating the fair provision of CPU time in a CPU cycle to a plurality of groups, as well as dynamically adjusting the CPU time provided to each group, in accordance with at least one embodiment.

FIG. 3 is a block diagram illustrating an exemplary method 300 for the fair provision of central processing unit (CPU) time in a CPU cycle to a plurality of groups, as well as dynamically adjusting the CPU time provided to each group, in accordance with at least one embodiment. In embodiments where the CPU cycles are serving a multi-user environment, the CPU cycles, such as a CPU cycle 302, may be approximately, e.g., 100 milliseconds (ms). In contrast, CPU cycles longer than 100 milliseconds (ms) may cause a perception of delay for the interactive sessions of the multi-user environment.

For example, the CPU scheduler 200 (FIG. 2) may be configured to allocate the CPU cycle 302 into equal CPU time intervals 304-306 for the corresponding groups 312-316. The time intervals 304-306 are identical, or substantially identical, in duration. However, each of the groups 312-316 may include different number of processes. As shown in FIG. 3, during the exemplary CPU cycle 302, the CPU scheduler 200 may first provide CPU time to the group 312 for the duration of the time interval 304. At the end of the time interval 312, the CPU scheduler 200 may command the CPU to suspend the processing of the group 312 (as illustrated by the stop point 320). Subsequently, the CPU scheduler 200 may provide CPU time to the group 314 for the time interval 306, before suspending the processing of group 314 as the time interval 306 expires (as illustrated by stop point 322). Likewise, the CPU scheduler 200 may then provide CPU time to the group 316 for duration of the time interval 308. The end of the time interval 308 coincides with the conclusion of the CPU cycle 302. Accordingly, the CPU scheduler 200 may initiate a new CPU cycle 324.

The ability of the CPU scheduler 200 to dynamically redistribute a CPU cycle to accommodate one or more new groups that need CPU time is illustrated with respect to the exemplary CPU cycle 324. As shown, the exemplary CPU cycle 324 has the same duration as the CPU cycle 302. However, prior to the initiation of the CPU cycle 324, the CPU scheduler 200 may have determined that an additional group 326 needs CPU time during the CPU cycle 324. Accordingly, the CPU scheduler 200 may allocate the CPU cycle 324 into equal, or substantially equal, time intervals 328-334. The time intervals 328-332 correspond to the previously processed groups 312-316, while the time interval 334 corresponds to the additional group 326. In various embodiments, the CPU scheduler 200 may sequentially provide CPU time to the groups 312-316 and 326 during CPU cycle 324 in a similar manner as in CPU cycle 302. For example, the suspension of time intervals that correspond to groups 312-316 during the CPU cycle 324 is illustrated by stop points 336-338, and the end of the time interval 334 corresponds to the conclusion of the CPU cycle 324. It will be appreciated that while the group 326 is illustrated as being given CPU time after groups 312-316, the group 326 may be given CPU time ahead of any of the other groups in other instances. Moreover, it will be further appreciated that in various embodiments, any number of groups may be processed in a CPU cycle, and the number of equally allocated time intervals is directly related to the number of groups being processed.

Figure 4:
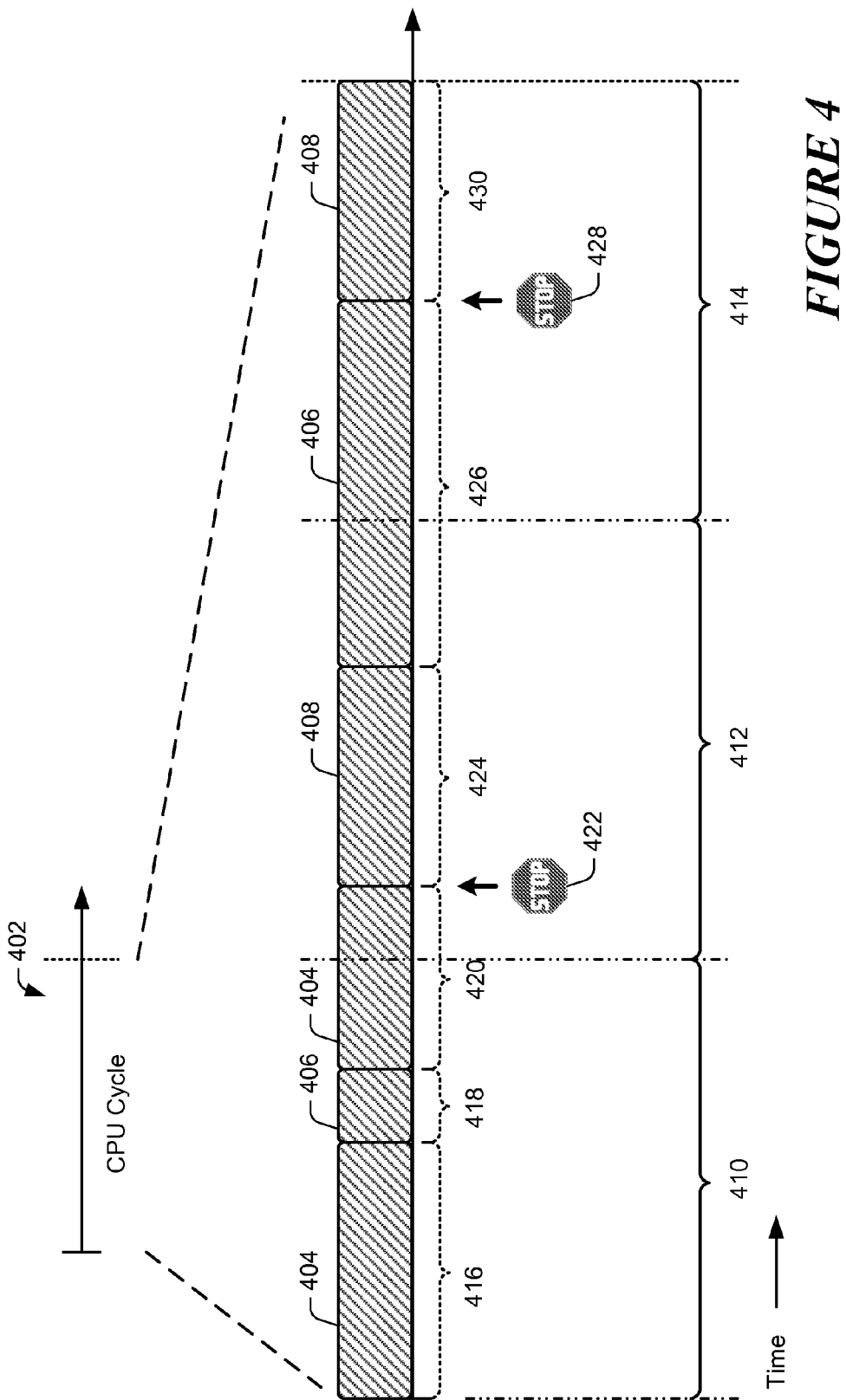
FIG. 4 illustrates the dynamic allocation of CPU time intervals in multiple time slices, in accordance with at least one embodiment.

FIG. 4 illustrates the dynamic allocation of CPU time intervals in multiple time slices, in accordance with an embodiment. As shown, the CPU scheduler 200 may allocate a CPU cycle 402 to provide CPU time to exemplary groups 404-408. Time intervals 410-414 represent the amount of CPU time each of the groups 404-408 is allocated, respectively, by the CPU scheduler 200. The CPU scheduler 200 may allocate the time intervals 410-414 so that they are of equal duration, or substantially equal duration.

However, as shown in FIG. 4, the CPU scheduler 200 may implement each of the time intervals 410-414 in multiple time slices rather than as continuous blocks. For example, the CPU scheduler 200 may allocate each of the time intervals 410-414 dynamically based upon each group's processing demand. In one instance, the CPU scheduler 200 may initially provide CPU time to the group 404 for a time slice 416. The time slice 416 may end when the group 404 becomes idle (e.g., all applications in the group are in waiting state) because its demand for CPU time is temporarily satiated. The CPU scheduler 200 may then provide CPU time to the group 406 for a time slice 418 until the group 406 also becomes idle. At this point, the CPU scheduler 200 may resume providing CPU time to the group 404. This may be due to the fact that the group 404 has ceased being idle and is once again demanding CPU time. Nevertheless, the maximum duration of CPU time the CPU scheduler 200 may provide to the group 404 is the time slice 420. The suspension of the time slice 420 is due to the fact that the group 404 is allocated time interval 410. The total duration of time slices 416 and 420 is equivalent to the total duration of the time interval 410. Thus, the CPU scheduler 200 is configured to cut off the time interval 420 at stop point 422, regardless of whether the group 404 needs additional CPU time.

Following the cessation of CPU time provision to the group 404 at the stop point 422, the CPU scheduler 200 may provide CPU time to the group 408. For example, the CPU scheduler 200 may have received and queued a CPU time request from the group 408 while it is providing the time slice 420 to the group 404. Accordingly, the CPU scheduler 200 may provide a CPU time slice 424 that suspends when the group 408 becomes idle.

Next, the CPU scheduler 200 may resume providing CPU time to the group 406, such as in a case where it is no longer idle. However, the CPU scheduler 200 may only provide CPU time in the form of time slice 426. The time slice 426 is suspended at the stop point 428 when the CPU scheduler 200 determines that the total duration of time slices 418 and 426 is equivalent to the allocated time interval 412. Subsequently, since both groups 404 and 406 have been provided with their allocated time intervals, the CPU scheduler 200 may once again provide CPU time to group 408 (assuming it needs additional CPU time) in the form of time slice 430 to complete the CPU cycle 402. The total of time slices 424 and 430, as provided to group 408, is equal, or substantially equal, in duration to the time interval 414.

While the allocation CPU time to group 404-408 in multiple time slices have been discussed in the context of the exemplary CPU cycle 402, the exemplary CPU cycle 402 is meant to be illustrative rather than limiting. It will be appreciated that in various embodiments, any number of groups may be processed in a CPU cycle, and the number of equally allocated time intervals is directly related to the number of groups being processed. Moreover, a CPU scheduler, such as a CPU scheduler 200, may divide a particular allocated time interval into multiple time slices based on a variety of factors. These factors may include the demand or cessation of demand for CPU time from each of a plurality of groups during a CPU cycle, priorities that are assigned to each of a plurality of groups, as well as other factors.

Figure 5B:
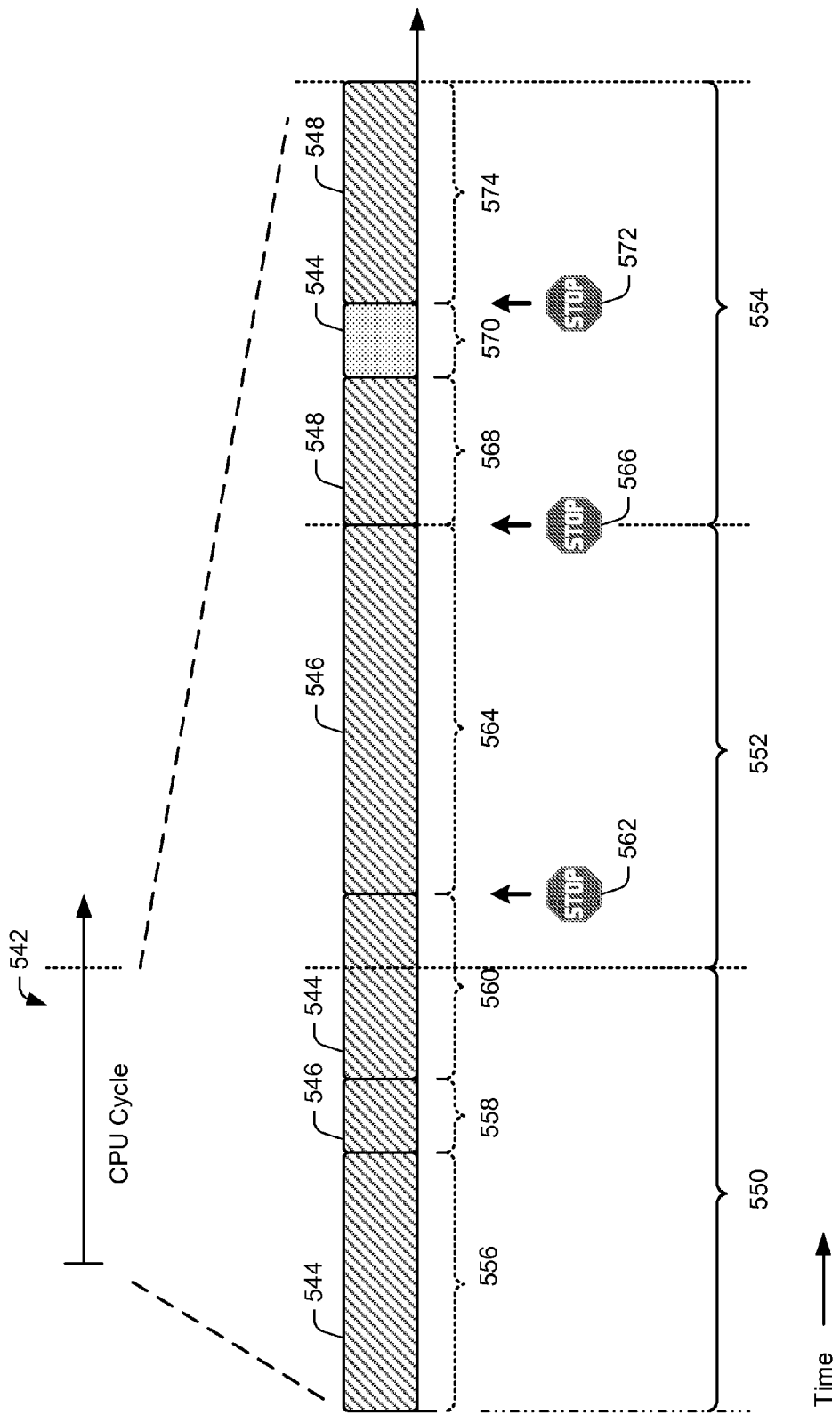

FIGS. 5A and 5B illustrate the conditional allocation of central processing unit (CPU) time to one or more group, wherein each conditional allocation is in addition to an equally allocated time interval of a CPU cycle, in accordance with one or more embodiments. As shown in FIG. 5A, the CPU scheduler 200 may allocate a CPU cycle 502 to provide CPU time to exemplary groups 504-508. Time intervals 510-514 represent the amount of CPU time each of the groups 504-508 is allocated, respectively, by the CPU scheduler 200. The CPU scheduler 200 may allocate the time intervals 510-514 so that they are of equal, or substantially equal, duration.

The CPU scheduler 200 may implement each of the time intervals 510-514 in multiple time slices rather as continuous blocks. For example, the CPU scheduler 200 may allocate each of the time intervals 510-514 dynamically based upon each group's processing demand. In one instance, the CPU scheduler 200 may initially provide CPU time to the group 504 for a time slice 516. The time slice 516 may end when the group 504 becomes idle because its demand for CPU time is temporarily satiated. The CPU scheduler 200 may then provide CPU time to the group 506 for a time slice 518 until the group 506 also becomes idle. At this point, the CPU scheduler 200 may resume providing CPU time to the group 504. This may be due to the fact that the group 504 has ceased being idle and is once again demanding CPU time. Nevertheless, the maximum duration of CPU time the CPU scheduler 200 may provide to the group 504 is the time slice 520. The cessation of the time slice 520 at stop point 522 by the CPU scheduler 200 is due to the fact that the group 504 is allocated the time interval 510. Accordingly, the total duration of the time slices 516 and 520 is equivalent to the total duration of the time interval 510.

Next, the CPU scheduler 200 may resume providing CPU time to the group 506, such as when it is no longer idle. The CPU scheduler 200 may provide CPU time in the form of time slice 524. The CPU scheduler 200 may suspend the time slice 524 at the stop point 526 when the CPU scheduler 200 determines that the total duration of the time slices 518 and 524 is equivalent, or substantially equivalent, to the allocated time interval 512. Subsequently, the CPU scheduler 200 may provide CPU time in the form of time slice 528 to the group 508. However, due to a lack of demand for CPU time from the group 508, time slice 528 may constitute only a portion of the time interval 514 that is allocated to the group 508.

Since the CPU cycle 502 is not complete, the CPU scheduler 200 may dynamically distribute the remaining CPU time to one or more groups that have already used up their allocated time intervals. In some embodiments, the CPU scheduler 102 may make this dynamic distribution of the remaining CPU time based on the demands or processing priority of the groups. For example, the remaining CPU time in the CPU cycle 502 may be first apportioned to the group 504 for a first duration, and then apportioned to the group 506 for a second duration until the CPU cycle 502 is complete.

FIG. 5B illustrates an exemplary conditional allocation of CPU time to a first group that is suspended due to the resumption from idle of a second group. In this example, the first group is a group that has already consumed its allocated time interval during the CPU cycle, while the second group is a group that has not consumed its allocated time interval. As shown in FIG. 5B, the CPU scheduler 200 may allocate a CPU cycle 542 to provide CPU time to exemplary groups 544-548. Time intervals 550-554 represent the amount of CPU time each of the groups 544-548 is allocated, respectively, by the CPU scheduler 200. The CPU scheduler 200 may allocate the time intervals 550-554 so that they are of equal or substantially equal duration.

The distribution of time slices 556-564 respectively to the groups 544-546, as shown in FIG. 5B, is similar to the distribution of the time slices 516-524 respectively to the groups 504-506. As shown, the CPU scheduler 200 suspended time slice 560 at the stop point 562 so that the total duration of the CPU time slices 556 and 560 provided to the group 544 is equivalent to the time interval 550. Likewise, the CPU scheduler 220 also suspended time slice 564 at the stop point 566 so that the total duration of the CPU time slices 586 and 564 provided to the group 546 is equivalent to the time interval 552.

Subsequently, the CPU scheduler 200 may provide CPU time in the form of time slice 568 to the group 548. However, due to a lack of demand for CPU time from group 548, the time slice 568 may end prior to the completion of the CPU cycle 542. Since the CPU cycle 502 is not complete, the CPU scheduler 200 may dynamically distribute the remaining CPU time to one or more groups that have already used up their allocated time intervals. In some embodiments, the CPU scheduler 200 may make this dynamic distribution of the remaining CPU time based on the demands or processing priority of the groups. For example, the CPU scheduler may distribute at least a portion of the remaining CPU time to group 544 in the form of time slice 570.

Nevertheless, the CPU scheduler 200 may suspend time slice 570 at stop point 572 when it determines that the group 548 is no longer idle. Upon the resumption of activity by the group 548, the CPU scheduler 200 may immediately cease the time slice 570 and devote the rest of the CPU cycle 542 to the group 548 (i.e., time slice 574). This suspension and redistribution activity is prompted by the fact that while the group 544 has consumed its allocated time interval 552 (i.e., via the time slices 556 and 560), the group 548 did not consume its time interval 554 prior to the conditional allocation of the time slice 570 to group 544. Accordingly, the CPU scheduler 200 may prioritize the CPU time demand of group 548 over the CPU time demand of group 544. In this way, the CPU scheduler 200 may be configured to achieve the most equitable distribution of CPU time to every group that needs processing during the CPU cycle.

It will be appreciated that the conditional allocation of CPU time, as shown, is meant to be illustrative rather than limiting. According to various embodiments, any number of groups may be processed in a CPU cycle, and the number and the durations of the equally allocated time intervals are directly related to the number of groups being processed in a CPU cycle. Moreover, a CPU scheduler, such as a CPU scheduler 200, may divide a particular allocated time interval into multiple time slices in a variety of ways based on parameters such as demand for CPU time and the priority of the groups.

Figure 6:
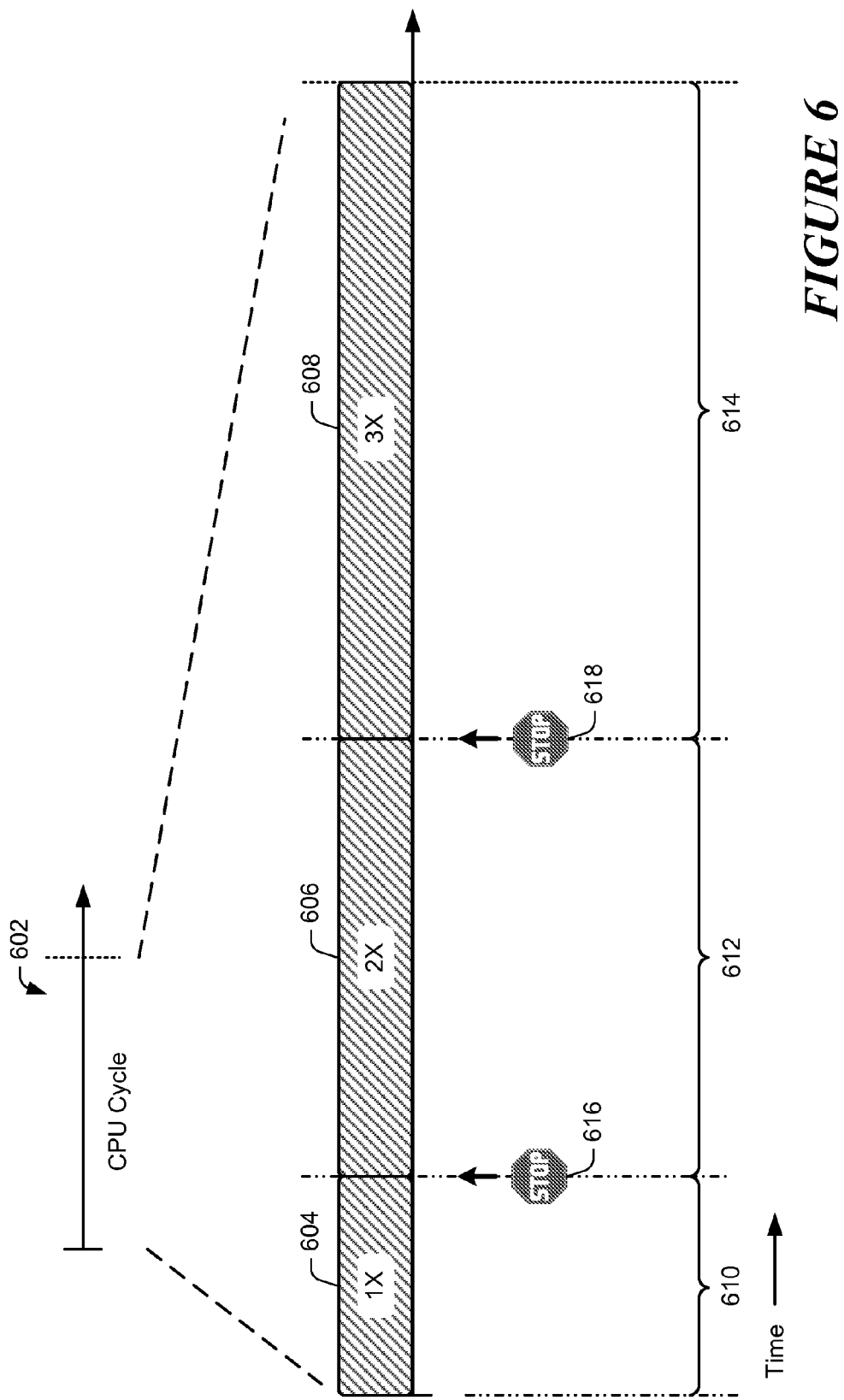
FIG. 6 is a block diagram illustrating the provision of CPU time in a CPU cycle to a plurality of groups according to weight.

FIG. 6 is a block diagram illustrating the provision of CPU time in a CPU cycle to a plurality of groups according to weight, For example, the CPU scheduler 200 (FIG. 2) may assign a weight to each of the groups 604-608. As shown, group 604 may be assigned a weight factor of one, or "1X", and group 606 may be assigned a weight factor of two, or "2X". Additionally, group 608 may be assigned a weight factor of three, or "3X." In various instances, the CPU scheduler 200 may assign the weight factors using one or more criteria set by a user via the user interface 212. These criteria may include user provided priority and/or importance ratings for each group.

Accordingly, the CPU scheduler 200 may allocate an exemplary CPU cycle 602 into time intervals 610-614 for the groups 604-608, respectively. In one embodiment, the time intervals 610-614 are allocated in direct correlation to the weight factor assigned to each group. For example, as shown in FIG. 6, the CPU scheduler 200 may allocate a time interval 612 that has a duration that is twice as long as the allocated time interval 610. This is because group 606 is assigned a weight factor of two, while group 604 is assigned a weight factor of one. Likewise, the CPU scheduler 200 may allocate the time interval 614 for the group 606 so that it has a duration that is three times as long as the duration of the time interval 610. Once again, the allocation of the time interval 614 is based on the weight factor of three.

During the execution of the exemplary CPU cycle 608, the CPU scheduler 200 may first provide CPU time to the group 604 for the duration of the time interval 610. At the end of the time interval 610, the CPU scheduler 200 may command the CPU to suspend the processing of the group 604 (as illustrated by the stop point 616). Subsequently, the CPU scheduler 200 may provide CPU time to the group 606 for the time interval 612, before terminating the processing of group 606 as the time interval 612 expires (as illustrated by stop point 618). Further, the CPU scheduler 200 may then provide CPU time to the group 608 for duration of the time interval 614. The end of the time interval 614 coincides with the conclusion of the CPU cycle 608.

It will be appreciated that any weight factor may be assigned to each of the groups in other embodiments so long as the CPU scheduler 200 is able to allocate a CPU cycle based on the weights. The ability to use weights to direct the allocation of a CPU cycle may enable allocation based on priority and/or importance of the groups. Moreover, the CPU scheduler 200 may integrate the use of weight factors for the groups with one or more of the dynamic reallocation and time slice mechanisms described above in additional embodiments.

Exemplary Processes

Figure 7:
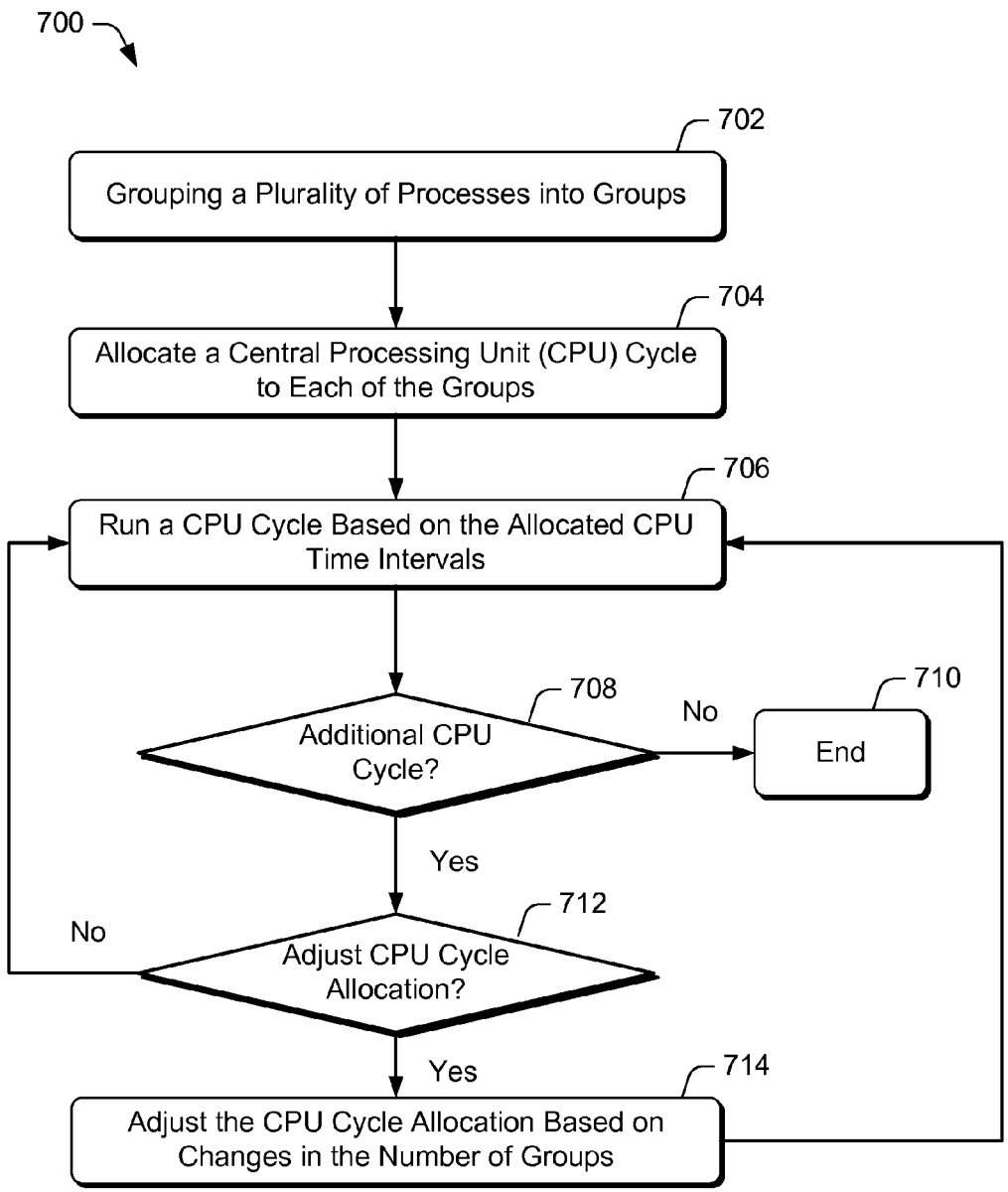
FIG. 7 is a flow diagram illustrating an exemplary process for the fair and dynamic provision of CPU time to each group, as well as dynamically adjusts the CPU time provided to each group, in accordance with at least one embodiment.
Figure 8:
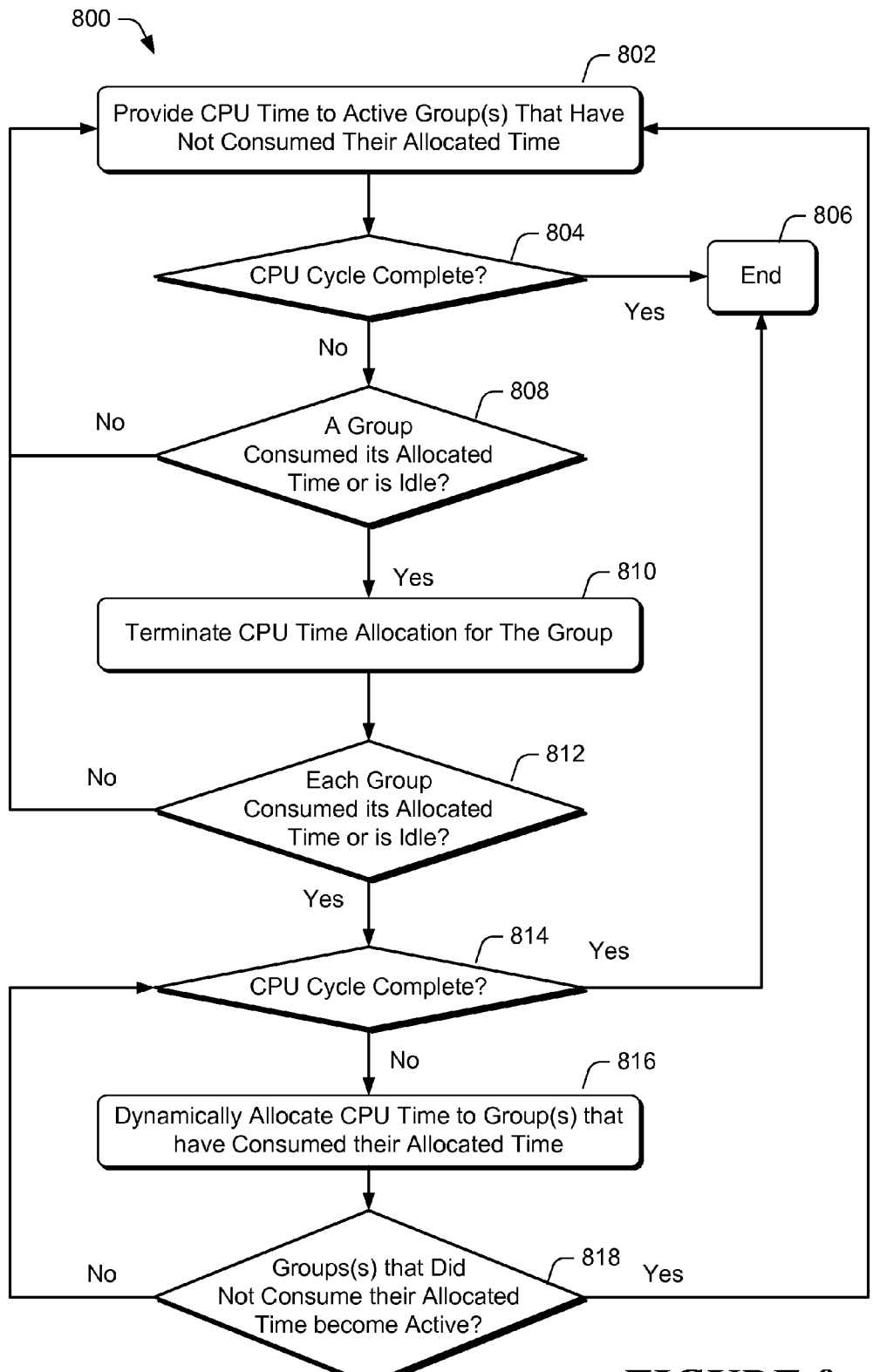
FIG. 8 is a flow diagram illustrating the dynamic distribution of CPU time to each of a plurality of groups in multiple time slices, in accordance with at least one embodiment.

FIGS. 7-8 illustrate exemplary processes that facilitate the implementation of differentiated access to networked resources, in accordance with one or more embodiments. The exemplary processes in FIGS. 7-8 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the central processing unit (CPU) scheduler 200 of FIG. 2, although they may be implemented in other CPU scheduler architectures.

FIG. 7 is a block diagram illustrating an exemplary process 700 for implementing fair and dynamic distribution of central processing unit (CPU) time to a plurality of groups, in accordance with at least one embodiment. At block 702, the CPU scheduler 200 may group a plurality of processes into groups according to one or more classification criteria. In the case of a multi-user environment, the CPU scheduler 200 may group the processes according to the interactive session each process serves. In other embodiments, the CPU scheduler 200 may group the processes according to additional classification criteria, such as whether the processes act on multimedia content or non-multimedia content. At block 704, the CPU scheduler 200 may allocate a CPU cycle to each of the groups.

According to various embodiments, the CPU cycle may be distributed equally among the groups, such that the duration of the CPU time interval distributed to each group is identical. In other embodiments, the CPU cycle may be distributed according to the weight factor assigned to each group, so that some groups may receive more CPU time than other groups. At block 706, the CPU scheduler 200 may run a CPU cycle based on the allocated time intervals. In one embodiment, the CPU scheduler 200 may sequentially provide CPU time to each of the groups for the duration of the allocated time intervals until the CPU cycle is completed.

At decision block 708, the CPU scheduler 200 may determine whether another CPU cycle is to be performed. If the CPU scheduler 200 determines that no further CPU cycles are to be performed ("no" at decision block 708), the process 700 may suspend at block 710. However, if the CPU scheduler 200 determines that an additional CPU cycle is to be performed ("yes" at decision block 708), the process 700 may proceed to decision block 712.

At decision block 712, the CPU scheduler 200 may determine whether an adjustment to the CPU cycle allocations are necessary, such as due to an increase or decrease in the number of groups that need CPU time. If the CPU scheduler 200 determines that the CPU time allocation should not be adjusted ("no" at decision block 712), the process 700 may loop back to block 706, where a CPU cycle based on the allocated CPU time intervals may be performed again for the groups. However, if the CPU scheduler 200 determines that the CPU time allocation should be adjusted ("yes" at decision block 712), the process 700 may proceed to block 714.

At block 714, the CPU scheduler 400 may adjust the allocation of the CPU cycle based on changes in the number of groups that need CPU time. According to various embodiments, increases or decreases in the number of groups may change the duration of the time intervals assigned to each group. However, each of the duration nevertheless remains equal or substantially equal to the other durations. Thus, a fair round robin distribution of CPU time may be implemented regardless of the number groups. Once the CPU scheduler 200 has made the appropriate adjustment to the allocation of the time intervals in the CPU cycle, the process 700 may loop back to block 706, where a CPU cycle based on the allocated CPU time intervals may be performed again for the groups.

FIG. 8 is a flow diagram illustrating a process 800 that dynamically distributes central processing unit (CPU) time to each of a plurality of groups in multiple time slices, in accordance with at least one embodiment. At block 802, the CPU scheduler 200 may provide CPU time to one or more groups that have not consumed their allocated time interval and are active (i.e., not in a wait state). As described above, in some embodiments, each of the one or more groups may be allocated a CPU time interval that is equal, or substantially equal in duration to the respective time intervals allocated to the other groups. In other embodiments, the CPU scheduler 200 may allocate the time intervals based on weight factors assigned to each group. The CPU time interval allocated to a group is a duration during which the CPU is dedicated to the group. For example, the CPU time is dedicated to enabling the CPU to run the processes in the group.

At decision block 804, the CPU scheduler 200 may determine whether the CPU cycle is complete as a result of the provision of the CPU time to the one or more groups. For example, if the CPU scheduler 200 is providing CPU time to only a single group, the CPU scheduler 200 may devote and complete the entire CPU cycle for the single group. If the CPU cycle is complete ("yes" at decision block 804), the CPU cycle ends at block 806. Following the end of the CPU cycle, the CPU scheduler 200 may initiate an additional CPU cycle to process the one or more groups.

However, as long as the CPU scheduler 200 determines that the CPU cycle is not yet complete, the process may proceed to decision block 808. At decision block 808, the CPU scheduler 200 may also make a determination as to whether a group has consumed its allocated time interval or alternatively, has become idle (e.g., all applications in the group in waiting state). If the CPU scheduler 200 determines that a group has either consumed it allocated time interval or has become idle ("yes" at decision block 808), the CPU scheduler 200 may suspend the CPU time allocation for the group at block 810. Following block 810, the process 800 may proceed further to decision block 812. However, as long as the CPU scheduler 200 determines that a group has not met one of the conditions ("no" at decision block 808), the CPU scheduler 200 continues to provide CPU time to the one or more groups. In other words, process 800 may loop from decision block 808 back to block 802.

Returning to decision block 812, the CPU scheduler 200 may determine whether each of all the groups that is being process by the CPU cycle has consumed its time interval or alternatively, is idle. If the CPU scheduler 200 determines that at least one of the groups in the CPU cycle has not consumed its time interval and is active, the process 800 may loop back to block 802, where the CPU scheduler 200 continues to provide CPU time to the one or more groups. However, if CPU scheduler 200 determines that all groups in the CPU cycle are either idle or have consumed their time intervals, the process may proceed to decision block 814.

At decision block 814, the CPU scheduler 200 may determine whether the CPU cycle is complete. If the CPU cycle is complete ("yes" at decision block 804), the CPU cycle ends at block 806. Following the end of the CPU cycle, the CPU scheduler 200 may initiate an additional CPU cycle to process the one or more groups. However, as long as the CPU scheduler 200 determines that the CPU cycle is not yet complete, the process may proceed to block 816.

At block 816, the CPU scheduler 200 may dynamically allocate CPU time to one or more groups ("fulfilled groups") that have already consumed their allocated time. In this way, the CPU scheduler 200 may maximize CPU usage to enhance the processing of the groups. For example, the CPU scheduler 200 may perform the reallocation of CPU time to the one or more fulfilled groups based on parameters such as the demand and/or priority of each group for CPU time.

Nevertheless, at decision block 818, the CPU scheduler 200 may monitor one or more groups ("unfulfilled groups") that have not consumed their allocated time interval to determine whether they have resumed activity. For instance, these groups may include groups that were provided with CPU time but became idle during the CPU cycle. As long as the CPU scheduler 200 determines that one or more of these groups remain idle ("no" at decision block 818), the process may loop back to decision block 814. At decision block 814, if the CPU scheduler 200 also determines that the CPU cycle is not complete ("no" at decision block 814), the process will once again proceed to block 816, where the CPU scheduler 200 continues to dynamically allocate CPU time to one or more groups ("fulfilled groups") that have already consumed their allocated time.

However, if the CPU scheduler 200 determines that one or more of unfulfilled groups are no longer idle ("yes" at decision block 818), the process may loop back to block 802 where additional CPU time is provided to the one or more groups.

It will be appreciated that the dynamic allocation of CPU time, as shown, is meant to be illustrative rather than limiting. In other embodiments, the dynamic allocation of CPU may be implemented in alternative processes.

Exemplary Computing Environment

Figure 9:
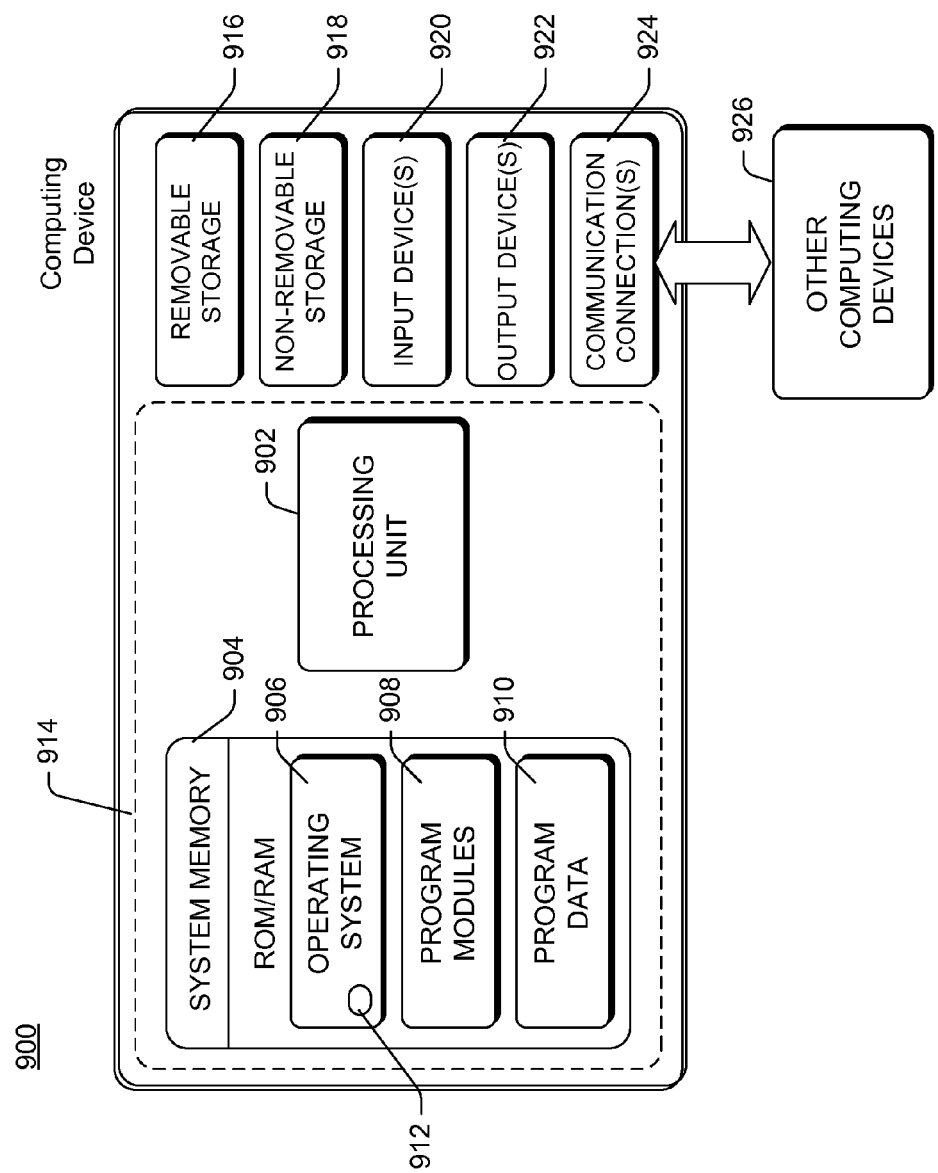
FIG. 9 is a block diagram illustrating a representative computing environment, in accordance with at least one embodiment.

FIG. 9 illustrates a representative computing device 900 that may be used to implement the fair and dynamic distribution of central processing unit (CPU) time to each of a plurality of groups that includes processes. For example, the CPU scheduler 200 (FIG. 2) may be implemented on the representative computing device 900 to control the at least one processing unit 902. However, it is readily appreciated that the various embodiments of the fair and dynamic CPU time distribution techniques and mechanisms may be implemented in other computing devices, systems, and environments. The computing device 900 shown in FIG. 9 is only one example of a computing device and is not intended to suggest any limitation as to the scope of use or functionality of the computer and network architectures. Neither should the computing device 900 be interpreted as having any dependency or requirement relating to any one or combination of components illustrated in the example computing device.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 906, one or more program modules 908, and may include program data 910. The operating system 906 include a component-based framework 912 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 900 is of a very basic configuration demarcated by a dashed line 914. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 916 and non-removable storage 918. Computer storage media may include volatile and nonvolatile, removable and non-removable media implemented in any method or technology for storage of information, such as computer readable instructions, data structures, program modules, or other data. System memory 904, removable storage 916 and non-removable storage 918 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 920 such as keyboard, mouse, pen, voice input device, touch input device, etc. Output device(s) 922 such as a display, speakers, printer, etc. may also be included. These devices are well know in the art and are not discussed at length here.

Computing device 900 may also contain communication connections 924 that allow the device to communicate with other computing devices 926, such as over a network. These networks may include wired networks as well as wireless networks. Communication connections 924 are one example of communication media. Communication media may typically be embodied by computer readable instructions, data structures, program modules, etc.

It will be appreciated that the illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The provision of fair and dynamic distribution of central processing unit (CPU) time to a plurality of groups, such as groups of processes running in a multi-user environment, may maximize CPU time usage while serving to enhance user experience. For example, the fair and dynamic distribution of CPU time to groups may ensure that no interactive session on a particular terminal client is starved of CPU time due to another interactive session consuming a disproportionate amount of CPU time. Thus, embodiments in accordance with this disclosure may diminish delays and hesitations that users may experience at terminal clients.

CONCLUSION

In closing, although the various embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method, comprising:
    organizing processes that serve remote sessions into a plurality of groups, each group including every process that serves a corresponding single remote session that executes on a corresponding single remote client, at least two groups of the plurality of groups having different numbers of processes;
    allocating a corresponding central processing unit (CPU) time interval to each group that includes every process associated with a respective single remote session by equally distributing a CPU cycle based on a quantity of the plurality of groups;
    adjusting the CPU time intervals based on a change in the quantity of the plurality of groups;
    providing one or more portions of the CP cycle to each of the plurality of groups until each group is one of idle or consumes its corresponding CPU time interval; and
    providing one or more additional portions of the CPU cycle to at least a firs group that has consumed its corresponding CPU time interval when at least a second group that has not consumed its corresponding time interval is idle and the CPU cycle is not complete.

2. The method of claim 1, wherein each group includes a plurality of processes.

3. The method of claim 1, wherein each process is a multimedia process or a non-multimedia process.

4. The method of claim 1, further comprising:
providing an additional CPU cycle to the first group until the first group consumes its corresponding CPU time interval; and
providing the additional CPU cycle to the second group until the second group consumes its corresponding CPU time interval of the additional CPU cycle.

5. The method of claim 1, further comprising:
providing one or more portions of an additional CPU cycle to a group as long as the group has not consumed its corresponding CPU time interval; and
terminating the allocation of the additional CPU cycle to the group when the group has consumed its corresponding time interval of the additional CPU cycle.

6. The method of claim 1, further comprising:
providing one or more first portions of an additional CPU cycle to the first group until the first group consumes its corresponding CPU time interval of the additional CPU cycle; and
providing one or more second portions of the additional CPU cycle to the second group until the second group consumes its corresponding CPU time interval of the additional CPU cycle,
wherein the one or more first portions and the one or more second portions are provided in order of demand for processing time by each group of multiple processes.

7. The method of claim 1, further comprising:
providing one or more portions of an additional CPU cycle to each of the plurality of groups until each group is one of idle or consumes its corresponding time interval of the additional CPU cycle; and
providing one or more additional portions of the additional CPU cycle to at least one group that has not consumed its corresponding time interval of the additional CPU cycle when the at least one group is no longer idle and the additional CPU cycle is not complete.

8. A computer readable memory having computer-executable instructions that, when executed, perform acts comprising:
organizing one or more processes into one or more groups;
allocating a corresponding central processing unit (CPU) time interval for each group by equally distributing a CPU cycle based on a quantity of the groups;
providing one or more portions of the CPU cycle to each of a plurality of groups until each group is one of idle or consumes its corresponding time interval; and
providing one or more additional portions of the CPU cycle to a first group that has consumed its corresponding time interval when a second group that has not consumed its corresponding time interval is idle and the CPU cycle is not complete, wherein a group is idle when every process in the group enters a wait state.

9. The computer readable memory of claim 8, further comprising:
providing one or more additional portions of the CPU cycle to the second group when the second group is no longer idle and the CPU cycle is not complete.

10. The computer readable memory of claim 8, wherein each group includes a plurality of processes, and wherein processing one or more portions in each group includes providing processing time to at least one of the plurality of processes.

11. The computer readable memory of claim 8, wherein each group includes a plurality of processes, and wherein processing one or more additional portions of a group includes providing processing time to at least one of the plurality of processes.

12. The computer readable memory of claim 8, wherein each group includes a plurality of processes that serve a single remote client.

13. The computer readable memory of claim 8, wherein providing one or more portions of the CPU cycle includes providing the one or more portions to each group in order of demand.

14. A system, comprising:
one or more processors; and
memory allocated to store a plurality of computer-executable instructions for execution by the one or more processors, the computer-executable instructions comprising:
organizing multiple processes that serve remote sessions into a plurality of groups, each group including every process that serves a corresponding single remote client;
allocating a first set of equal central processing unit (CPU) time intervals that include a corresponding CPU time interval for each group by equally distributing a first CPU cycle based on a quantity of the plurality of groups, each group including every process associated with a respective single remote session;
allocating a second set of CPU time intervals that include a corresponding CPU time interval for each group by distributing a CPU cycle based at least on a quantity of the one or more groups and in direct proportion to a corresponding weight factor assigned to each group by a user; and
adjusting the second set of CPU time intervals based on a change in the quantity of the one or more groups.

15. The system of claim 14, wherein at least two groups in the plurality of groups have different numbers of processes.

16. The system of claim 14, wherein each weight factor represents an importance of a respective group to the user.

17. The system of claim 14, wherein each group includes a plurality of processes.

18. The system of claim 14, the computer-executable instructions further comprising:
providing the CPU cycle to a first group until the first group consumes its corresponding CPU time interval; and
providing the CPU cycle to a second group until the second group consumes its corresponding CPU time interval.

19. The system of claim 18, wherein each group includes a plurality of processes that serve a single remote client.

* * * * *